UNITED STATES PATENT OFFICE 2,412,596

INHIBITING MOLD IN DAIRY PRODUCTS

Hans F. Bauer and Elmer F. Glabe, Chicago, Ill., assignors, by mesne assignments, to Stein, Hall & Co., Inc., a corporation of New York No Drawing. Application February 2, 1942, Serial No. 429,286

6 Claims. (Cl. 99—150)

This invention relates to the retardation or inhibition of the growth and development of food destroying bacteria and molds in dairy products, more particularly in milk, butter, cheese and other dairy products derived from milk.

The present application is a continuation-in-part of our co-pending applications Serial No. 278,588, filed June 12, 1939, now Patent No. 2,271,756, granted February 3, 1942, and Serial No. 347,156, filed July 24, 1940, both of which applications disclose but do not specifically claim the treatment of milk derived products in order to inhibit or retard the development and growth of micro-organisms such as bacteria and molds commonly found in such products.

One of the objects of the present invention is to provide a new and improved type of composition for inhibiting or retarding the growth and development of food destroying bacteria and molds commonly found in milk, cheese, butter, buttermilk and other dairy products.

Another object of the invention is to provide a new and improved method for treating milk, butter, cheese, buttermilk and other dairy products in order to retard or to inhibit the growth and development of food destroying bacteria and molds.

Other objects and advantages of the invention will appear from the following description thereof.

In accordance with the invention, it has been found that a particular class or type of agent comprising an acetate containing combined but undissociated acetic acid in its molecule, and preferably sodium diacetate having the formula:

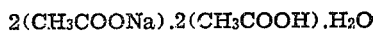

$$2(CH_3COONa).2(CH_3COOH).H_2O$$

has the property of retarding, inhibiting and preventing the growth and development of micro-organisms such as bacteria and molds commonly found in dairy products such as milk, butter, cheese, buttermilk and other milk derived products. One of the features of the invention is that only a very small amount of the bacteria and mold inhibiting composition is required to prevent the action of the food destroying bacteria and molds and to retain the dairy products in a usable state over a substantial period of time. Another feature of the invention is that the bacteria and mold inhibiting composition does not substantially affect the taste, food value or other properties of the dairy products.

The invention will be further illustrated, but is not limited by the following examples in which the quantities are stated in parts by weight, unless otherwise indicated:

Example I

In this example the dairy product treated was butter. Butter is ordinarily sold in a wrapped form and there is often a tendency for mold to develop between the butter and the wrapper, particularly when a substantial amount of moisture is present, as is usually the case.

In the present example, the parchment paper normally used to wrap butter was dipped for 2 minutes in a cold solution made by blending together 80 parts of sodium diacetate and 20 parts of potato starch, then mixing the blend with sufficient water to form a 5% solution and cooking the mixture by heating to a temperature of 185° F. until a uniform dispersion was obtained. After cooking, the dispersion was allowed to cool and thereafter the parchment paper was dipped in the dispersion, as previously indicated.

The paper thus treated was then used to wrap butter in the usual manner and a series of tests was made in order to demonstrate the bacteria and mold inhibiting properties of the treating composition.

These tests were conducted as follows: The test apparatus was sterilized by heating, a glass test vessel being employed. Four such test vessels were used and in the first there was placed a piece of wet parchment paper of the type used in wrapping the butter, but which had not been treated in any way. In the second vessel there was placed a sample of butter wrapped in the same type of parchment paper which was placed in the first vessel. The second sample likewise was not treated in any way. In the third vessel there was placed a sample of paper which had been coated by dipping in the manner previously described in a dispersion of sodium diacetate and potato starch. In the fourth test vessel there was placed a sample of butter wrapped with a sample of the treated paper of the same type used in the third test vessel.

None of the samples exhibited any mold growth on the 15th day after their preparation. On the 15th day all samples were inoculated with common molds such as *Rhizopus nigricans*, Penicillium, etc. The samples had all been stored in a refrigerator at 40° F. the first 9 days and from then on the temperature was room temperature, around 75° F.

The first and second control samples showed pronounced mold growth on the 21st day. The third sample, that is, the parchment paper coated with the inhibiting composition, showed slight mold growth on the 31st day and the fourth sample, that is, the butter treated with the inhibiting composition by being wrapped with the coated paper, showed slight mold growth on the 28th day.

*Example II*

In this example the procedure was the same as in Example I except that the inoculation was made with molds grown on whey instead of the common molds used in Example I. In this example the paper, the test vessel and the butter were all sterilized by heating. The results were substantially the same as in Example I. The purpose of this example was to demonstrate that the invention was effective with molds common to dairy products. Example I indicates the effectiveness of the invention with other common molds.

*Example III*

In this example the product treated was a cheese of the type known as "spread cheese," that is to say, a cheese which is suitable for spreading on bread, crackers, or the like. Sodium diacetate was incorporated directly into the cheese and intimately mixed therewith in proportions of about $\frac{1}{10}\%$ to around 2%. The control containing no sodium diacetate showed signs of mold in about 3 days and the treated cheese was still good after 10 days.

It will be understood that the foregoing examples are merely illustrative and not limitative. The invention is applicable in the treatment of all dairy products. Where the dairy product is a pressed cheese, the sodium diacetate may be applied by dipping the cheese in a solution of sodium diacetate or in a coating composition containing sodium diacetate and then applying a wrapper. This treatment will substantially inhibit or retard the growth and development of mold between the cheese and the wrapper, which is the point where it usually occurs. Among the various types of cheese which may be treated in this manner are American cheese, Swiss cheese, and other types of cheese normally sold in a relatively large bulk. It is also desirable, in accordance with the invention, to apply the sodium diacetate or a coating composition containing sodium diacetate, such as that described in Example I, to the cloth which is used to wrap the cheese. It will be understood that the sodium diacetate, or other water soluble complex acetate of the type previously described, may be applied both to the wrapper and to the dairy product and may also be incorporated within the dairy product. The treatment of the outside of the dairy product may be accomplished by dipping, spraying, or in any other suitable manner. The same is true with respect to the wrapper.

As previously indicated, the method of bringing the inhibiting composition into contact with the dairy product may be varied rather widely. The inhibiting composition may be applied as a coating to parchment paper, foil (e. g., tin, aluminum and lead foils) and other types of wrappings. This method is particularly useful in treating butter. In treating cheese, the wrapping may be parchment, Pliofilm, Cellophane, cheesecloth and other similar wrapping materials. Here again the wrapping may be coated. Likewise, it will be understood that the butter and cheese may be coated by dipping them directly into the inhibiting composition. The invention is not limited to any particular type of dairy product but may be employed in treating not only cheese and butter but also milk and derivatives of milk, including cream, powdered milk, powdered cream and buttermilk. In treating milk the inhibiting composition is dispersed in the milk. The same is true with respect to cream. In treating powdered milk and powdered cream a small amount of dry sodium diacetate or other complex acetate of the character described is dispersed with the powdered milk or powdered cream. The amount will ordinarily be about $\frac{1}{10}\%$ to about 2% by weight. In treating buttermilk the complex acetate is dispersed or dissolved in the buttermilk in the same manner as for whole milk.

While the invention has been described specifically with reference to sodium diacetate because this is practically the only salt of this type available commercially today, it is also applicable to the other acetate salts of a similar nature. A number of sodium acetate-acetic acid-water systems are known to exist as mentioned by Beilstein, 4th edition, vol. II, page 107. Solid salts containing combined but undissociated acetic acid can be prepared containing from, say, 20% to 40% available undissociated acid, but an acid sodium salt of acetic acid containing from about 25% to about 35% of available acetic acid is preferred for the purpose of this invention. The sodium diacetate now available commercially is said to contain 33% to 35% available acetic acid with a pH in 10% solution within the range of 4 to 5.5. Among the other complex acetates which may be employed in accordance with the invention are the other alkali metal complex salts such as the potassium salts.

It will be understood that the general aspects of the invention are disclosed in our co-pending applications previously referred to. The invention is particularly advantageous in providing a method of treating milk products by incorporating into such products only a relatively small amount of an inhibiting composition which does not affect the taste thereof and which at the same time is very effective, even when used in such small amounts.

The expressions "milk product" and "dairy product" are employed herein to describe generically products containing milk or derived directly from milk, including whole milk, buttermilk, butter, cheese and other similar products.

Having thus described the invention, what we claim as new and desire to secure by Letters Patent of the United States is:

1. A composition comprising butter and an alkali metal acetate salt containing combined but undissociated acetic acid in an amount corresponding to about 0.1% to 2% by weight of said composition.

2. A dairy product selected from the group consisting of milk, buttermilk, butter, cheese, powdered milk, powdered cream and whey, containing a substantial quantity of a non-toxic, water soluble alkali diacetate, the quantity of said alkali diacetate being effective to inhibit the growth and development of bacteria and mold in said product.

3. A dairy product selected from the group consisting of milk, buttermilk, butter, cheese, powdered milk, powdered cream and whey, containing a substantial quantity of a non-toxic water soluble alkali diacetate, the quantity of said alkali diacetate being within the range of about 0.1% to about 2% by weight of said product.

4. A composition comprising a dairy product selected from the group consisting of milk, buttermilk, butter, cheese, powdered milk, powdered cream and whey, containing therein sodium diacetate in an amount corresponding to about 0.1% to about 2% by weight of said composition.

5. The method of treating a dairy product selected from the group consisting of milk, buttermilk, butter, cheese, powdered milk, powdered cream and whey, in order to inhibit the action of bacteria and mold therein which comprises incorporating into said dairy product an alkali diacetate in an amount corresponding to about 0.1% to about 2% by weight of said product.

6. The method of treating a dairy product selected from the group consisting of milk, buttermilk, butter, cheese, powdered milk, powdered cream and whey, in order to inhibit the action of bacteria and mold therein which comprises incorporating into said dairy product sodium diacetate in an amount corresponding to about 0.1% to about 2% by weight of said product.

HANS F. BAUER.
ELMER F. GLABE.